United States Patent [19]
Masuda et al.

[11] Patent Number: 5,936,215
[45] Date of Patent: Aug. 10, 1999

[54] STEERING ROLLER CONNECTOR SIGNAL TRANSMISSION DEVICE ON A STEERING WHEEL COLUMN

[75] Inventors: Hiromi Masuda; Tomoyoshi Kikkawa, both of Shizuoka, Japan

[73] Assignee: Yazaki Corporation, Tokyo, Japan

[21] Appl. No.: 09/028,309

[22] Filed: Feb. 24, 1998

[30] Foreign Application Priority Data

Feb. 24, 1997 [JP] Japan ..................................... 9-039338

[51] Int. Cl.[6] .............................. H01H 3/16; H01H 9/00; H01R 39/00
[52] U.S. Cl. .......................... 200/61.3; 200/61.54; 439/15
[58] Field of Search ............................. 200/61.27–61.38, 200/61.54–61.57, 293–307; 439/15–34

[56] References Cited

U.S. PATENT DOCUMENTS

| | | | |
|---|---|---|---|
| 4,277,658 | 7/1981 | Delp et al. ............................ | 200/61.54 |
| 4,404,438 | 9/1983 | Honjo .................................... | 200/61.54 |
| 4,859,816 | 8/1989 | Tanaka .................................. | 200/61.27 |
| 5,046,951 | 9/1991 | Suzuki ................................... | 439/15 |
| 5,242,309 | 9/1993 | Hasegawa ................................ | 439/15 |
| 5,747,763 | 5/1998 | Uchiyama et al. ................... | 200/61.54 |
| 5,769,649 | 6/1998 | Welschholz et al. ................. | 439/15 X |
| 5,773,776 | 6/1998 | Uleski et al. ......................... | 200/61.27 |

FOREIGN PATENT DOCUMENTS

| | | | |
|---|---|---|---|
| 763447 | 3/1997 | European Pat. Off. ........ | B60R 16/00 |
| 763447-A2 | 3/1997 | European Pat. Off. ........ | B60R 16/00 |

*Primary Examiner*—J. R. Scott
*Attorney, Agent, or Firm*—Sughrue, Mion, Zinn, Macpeak & Seas, PLLC

[57] ABSTRACT

The signal transmission device 46 is structured such that a rotator formed as a rotating member is disposed inside and concentrically with an outer cylinder 47 formed as a fixed member, a spirally arranged electrical cable is stored in an annular storage chamber 60 formed between the outer cylinder 47 and rotator, and one end 50a of the electrical cable 50 is supported in the outer cylinder 47, whereas the other end 50b of the electrical cable 50 is supported in the rotator. In the signal transmission device for a steering roller connector 46, a canceler portion 57 is formed integrally in the upper cover 53 of the rotator. The canceler portion 57, as the steering is rotated and returned, contacts a return portion 59 formed in a turn signal cancel mechanism to thereby return turn signal lever 43 to a neutral position.

9 Claims, 7 Drawing Sheets

STEERING ROLLER CONNECTOR SIGNAL TRANSMISSION DEVICE ON A STEERING WHEEL COLUMN

BACKGROUND OF THE INVENTION

The present invention relates to a signal transmission device which is used to electrically connect an auxiliary device provided on a steering wheel side of a vehicle to a wiring harness which is provided on the vehicle body side.

As a signal transmission device which supplies electricity to an auxiliary device provided on a rotating steering wheel, there is also available a signal transmission device which employs a sliding contact system. However, for example, in an air bag system mounted onto a steering wheel, such sliding contacts can be cut off instantaneously, proving fatal to the air bag system. For this reason, a highly reliable cable type of electric connecting device, a Steering Roller Connector (SRC) is employed.

Here, FIG. 1 is an exploded perspective view of a conventional column and FIG. 2 is a section view of the column shown in FIG. 1 taken along the axial direction of a steering unit including a steering roller connector. An SRC 1 comprises an outer cylinder 3 which is a fixed member, and an inner cylinder 5 which is a rotating member and is coaxial with the outer cylinder 3. Outer cylinder 3 and inner cylinder 5 define an annular storage chamber which houses an electrical cable 6 stored in a spiral manner. One end of the cable 6 is guided out from the outer cylinder 3 and is connected to a wiring harness provided on the vehicle body side, while the other end of the cable 6 is guided out from the inner cylinder 5 and is connected to an auxiliary device such as a horn switch, a steering switch, or a squib provided in an inflator. The SRC 1 can be fixed to a column 9 in such a manner that a fixing portion 7 provided on the outer periphery of the outer cylinder 3 is fixed to a screw hole 11 formed in the column 9.

The column 9 includes a pair of connector storage portions 13 which are respectively formed on the two side surfaces thereof; and, a lever unit, such as a turn signal lever 15 or a wiper control switch 17, is mounted into one of the corresponding connector storage portions 13. Also, a canceler 19 is assembled to the column 9.

The canceler 19 includes an engaging projection 27 on the upper surface thereof and, in order to prevent its relative rotation to the SRC 1, the engaging projection 27 is engaged with the lower surface of the inner cylinder 5 of the SRC 1. Also, the canceler 19 can be rotated integrally with the steering and thus, if the canceler 19 is rotated integrally with steering, then it not only transmits the rotation of the steering to the inner cylinder 5 of the SRC 1 but also brings a canceler portion 23 into contact with a return portion 25 provided in a turn signal cancel mechanism (not shown) to thereby return or cancel the turn signal lever 15 to its neutral position. Between the canceler 19 and a base plate 29 provided in the column 9, there is interposed a spring 31 which is used to energize the canceler 19 toward the SRC 1. With this structure, even when the SRC 1 is mounted at a position where the engaging projection 27 is not engaged, the canceler 19 can be moved in the steering axial direction against the energizing force of the spring 31, thereby being able to prevent itself against breakage.

However, in the above-mentioned conventional column structure, since the SRC 1 is disposed on the column 9, the canceler 19 is disposed on the lower surface of the column 9 in such a manner that it can be moved in the steering axial direction, and the spring 31 is used to energize the canceler 19 toward the SRC 1, a wide space is required which extends in the steering axial direction and is used to store these component parts. This not only increases the size of the column structure, but also increases the number of parts to be disposed in the steering axial direction, thus increasing the number of man-hours required for assembly. Also, when the SRC 1 is stored within the column 9, because of the limited space, the cancel system must be replaced with an electronic system, which further increases the number of parts required as well as the cost of the whole device.

Further, since the spring load of the spring 31 is applied to the sliding surfaces of the spring 31 and the canceler 19, there is a friction loss in rotation, which in turn degrades the operating feeling of the steering.

SUMMARY OF THE INVENTION

The present invention aims at eliminating the drawbacks found in the above-mentioned conventional signal transmission device for a steering. Accordingly, it is an object of the invention to provide a signal transmission device for a steering which can eliminate the need for provision of a movably structured canceler using a spring and can structure a compact column with the reduced number of parts and at a low cost.

In attaining the above object, according to the invention, there is provided a signal transmission device comprising:

a column;

a turn signal lever mounted on the column and movable within a range containing its neutral position, the turn signal lever having a turn signal cancel mechanism with a return portion;

an outer cylinder fixedly mounted on the column; and an inner cylinder rotatably disposed inside and concentrically with the outer cylinder; and a spirally arranged cable stored in an annular storage chamber defined between the outer cylinder and the inner cylinder, one end of the cable being supported in the outer cylinder, the other end of the cable being supported in the inner cylinder;

wherein the inner cylinder is provided with an upper cover having a canceler portion which is contactable with the return portion so as to return the turn signal lever to its neutral position.

In the above-mentioned signal transmission device for a steering, the inner cylinder, the upper cover and the canceler portion are preferably formed integrally.

In addition, the signal transmission device for a steering may also be structured such that an auxiliary device connecting connector is disposed in the upper cover and the other end of the cable is connected to the present auxiliary device connecting connector.

Also, the signal transmission device for a steering may also be structured such that a steering wheel mounting contact surface is formed in the other portion of the upper surface of the cover than the canceler portion, and either of the other end of the cable or the auxiliary device connecting connector is fixed to the upper surface of the canceler portion.

Further, the above-mentioned object can be attained by a signal transmission device for a steering comprising:

a column having an annular recessed portion formed in the upper surface thereof, through which a steering shaft can be inserted;

a turn signal lever mounted on the column and movable within a range containing its neutral position, the turn signal lever having a turn signal cancel mechanism with a return portion;

an upper cover for covering the recessed portion of the column, the upper cover being rotatable together with the steering shaft with respect to the column; and a spirally arranged cable stored in an annular storage chamber defined between the recessed portion and the upper cover, wherein the upper cover is provided with a canceler portion which is contactable with the return portion so as to return the turn signal lever to its neutral position.

In the above-mentioned signal transmission device for a steering, the annular recessed portion may extend coaxially with the steering shaft, and the upper cover may be rotatably mounted on the column while the upper cover closes the upper surface opening of the annular recessed portion.

Further, the above-mentioned object can also be attained by a signal transmission device for a steering comprising:

a column having an recessed portion;

a lever unit having a connector portion and being mounted on the column; and an inner cylinder rotatably disposed inside and concentrically with the recessed portion; and a spirally arranged cable stored in an annular storage chamber defined between the recessed portion and the inner cylinder, one end of the cable being supported in the column, the other end of the cable being supported in the inner cylinder;

wherein a connector storage portion is integrally formed in the column for mounting therein the connector portion of the lever unit to thereby electrically connect and hold the lever unit.

According to the signal transmission device for a steering in the above-mentioned manner, since there is employed the upper cover which can be rotated integrally with the steering and the canceler portion is integrally formed in the upper cover, not only the original function of a signal transmission device for a steering, that is, supply of electricity to the steering can be fulfilled but also the canceler portion can be contacted with the return portion of the turn signal cancel mechanism to thereby return the turn signal lever to its neutral position.

In addition, according to the signal transmission device for a steering structured such that the auxiliary device connecting connector is disposed on the upper cover, there can be eliminated the need for provision of a wiring harness, which makes it possible to connect the auxiliary device connecting connector directly to the auxiliary device terminal provided on the steering side.

Also, according to the signal transmission device for a steering structured such that the steering wheel mounting contact surface is formed in the other portion of the upper surface of the upper cover than the canceler portion, the steering wheel can be mounted onto the upper surface of the upper cover, so that the mounting height of the steering wheel can be lowered by an amount equivalent to the canceler portion.

Further, according to the signal transmission device for a steering structured such that the cable is stored in the annular recessed portion of the column, the signal transmission device for a steering can be assembled by using part of the column in common, which eliminates the need for provision of the outer cylinder.

Still further, according to the signal transmission device for a steering structured such that the connector storage portion is formed integrally in the outer cylinder, simply by assembling the signal transmission device for a steering, the column can be structured.

DETAILED DESCRIPTION OF THE PREFERRED EMBODIMENTS

Now, description will be given below in detail of preferred embodiments of a signal transmission device for a steering according to the invention with reference to the accompanying drawings.

Figure 3:
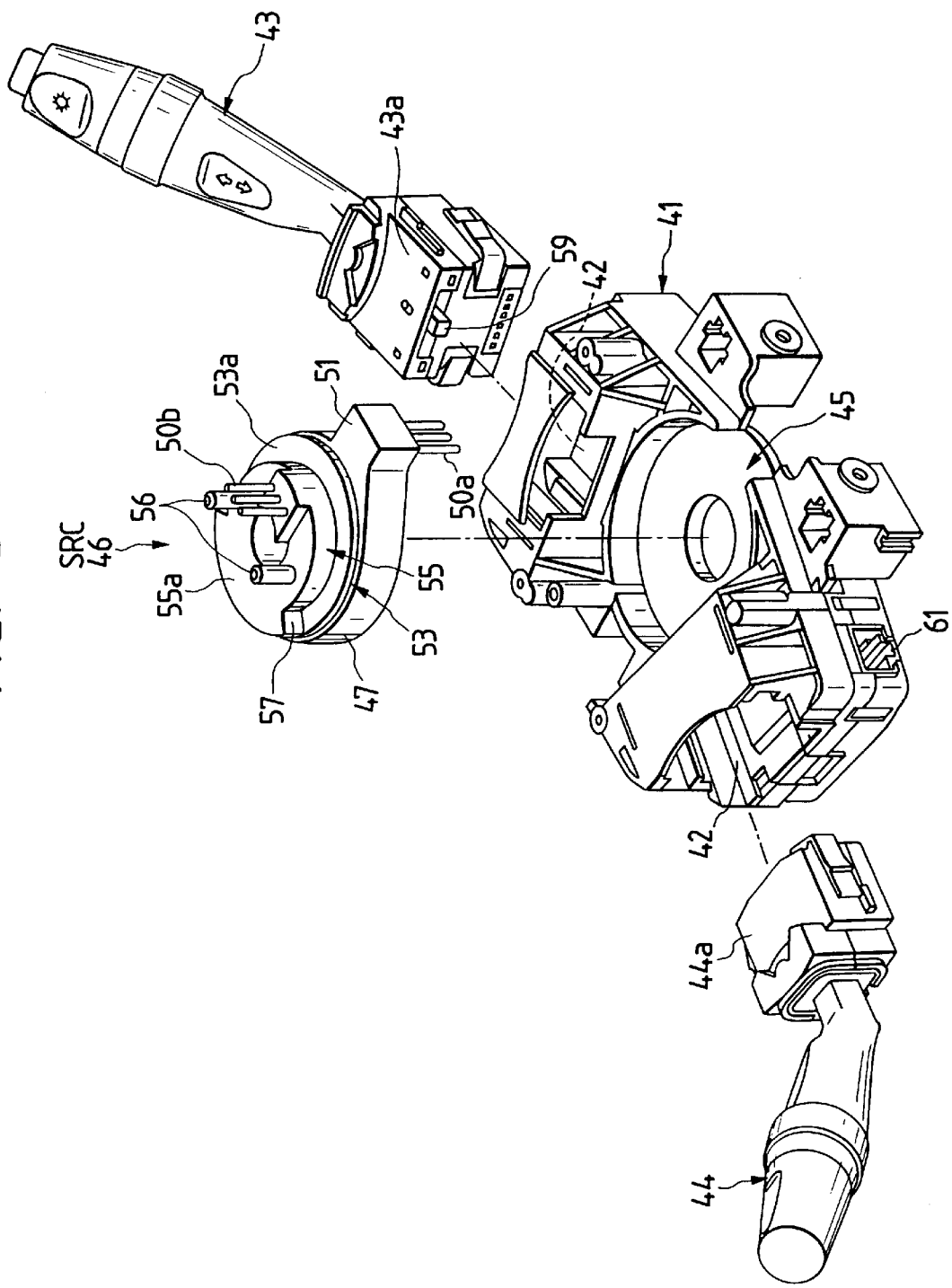
FIG. 3 is a perspective view of a first embodiment of a signal transmission device for a steering according to the invention, in which it is shown together with a column.
Figure 4:
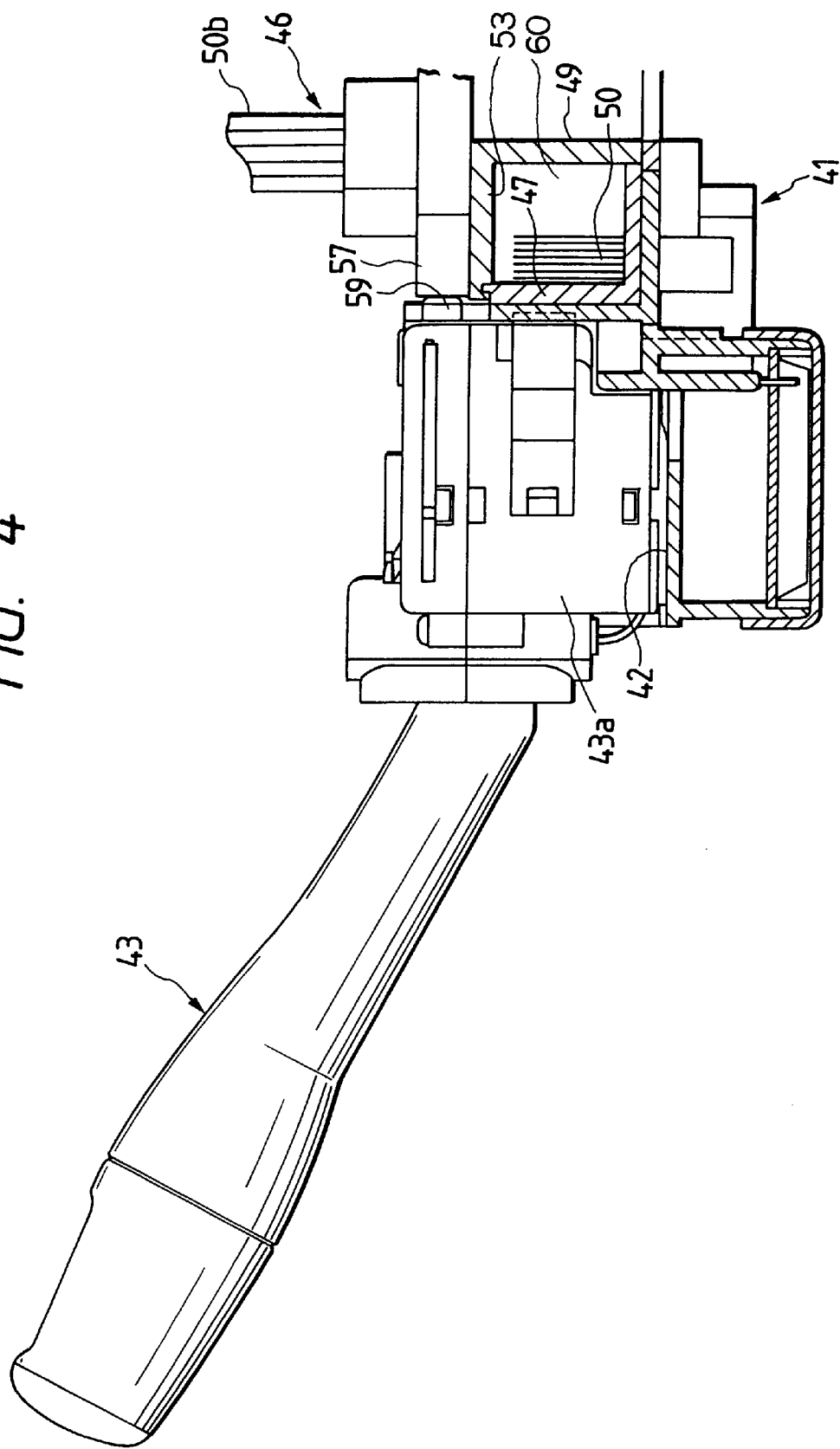
FIG. 4 is a partially sectional view of the signal transmission device for a steering shown in FIG. 3, showing a state thereof in which it is assembled to the column.

FIG. 3 is a perspective view of a first embodiment of a signal transmission device for a steering according to the invention, which is shown together with a column; and, FIG. 4 is a partially sectional view of the signal transmission device for a steering shown in FIG. 3, illustrating a state thereof in which it is assembled to the column.

In particular, a column 41 includes a pair of connector storage portions 42 respectively formed on the two side surfaces thereof, while each of the connector storage portions 42 is arranged such that it can store therein a connector portion 43a or 44a formed in the base end portion of a lever unit, such as a turn signal lever 43 or a wiper control switch lever 44.

The column 41 also includes an annular recessed portion 45 having an open upper surface in such a manner that the annular recessed portion 45 is coaxial with a steering shaft (not shown), while the annular recessed portion 45 is used to store and fix a signal transmission device for a steering roller connector (SRC) 46. The SRC 46 includes an outer cylinder 47 and a rotator 49 which can be rotated inside the outer cylinder 47. Outer cylinder 47 and rotator 49 define an annular storage chamber 60, which houses an electrical cable 50 in a spiral manner. In the outer cylinder 47, there is formed a guide portion 51 which allows one end 50a of the electrical cable 50 in the annular storage chamber 60 to exit the outside. The rotator 49 is mounted on the outer periphery of the steering shaft in such a manner that it is prevented from rotating with respect to the steering shaft.

The rotator 49 includes a disk-shaped upper cover 53 which is formed integrally with the rotator 49 and the rotator 49 and associated upper cover 53 rotatably engages and covers the upper surface opening of the outer cylinder 47.

The upper cover 53 includes an upper surface 53a and a platform plate portion 55 which is formed integrally with and projected from the upper surface 53a. The upper surface of the platform plate portion 55 is used as a contact surface 55a for mounting a steering wheel. On the contact surface 55a of the platform plate portion 55, there are erected a pair of bosses 56 which are respectively used to position a steering wheel. The platform plate portion 55 includes a canceler portion 57 which is formed by removing part of the circumferential portion of the platform plate portion 55 in such a manner that it is perpendicular to the upper surface 53a and stands up in the radial direction of the upper cover 53. When the canceler portion 57 is rotated integrally with the upper cover 53 during the return rotation of the steering wheel, then canceler portion 57 butts against a return portion 59 provided in a turn signal cancel mechanism to thereby return the turn signal lever 43 to its neutral position.

On the upper surface of the upper cover 53, there is guided the other end 50b of the cable; and, the other end 50b of the cable is connected to a squib terminal (not shown) disposed on the steering roller connector when the steering wheel is mounted onto the steering shaft. Also, the column 41 includes a collective connector 61 formed integrally therewith; and, electric circuits respectively for the turn signal lever 43, wiper control switch lever 44, cable end 50a drawn out from the guide portion 51 of the outer cylinder 47, a sensor and the like are collectively connected to the collective connector 61.

Figure 1:
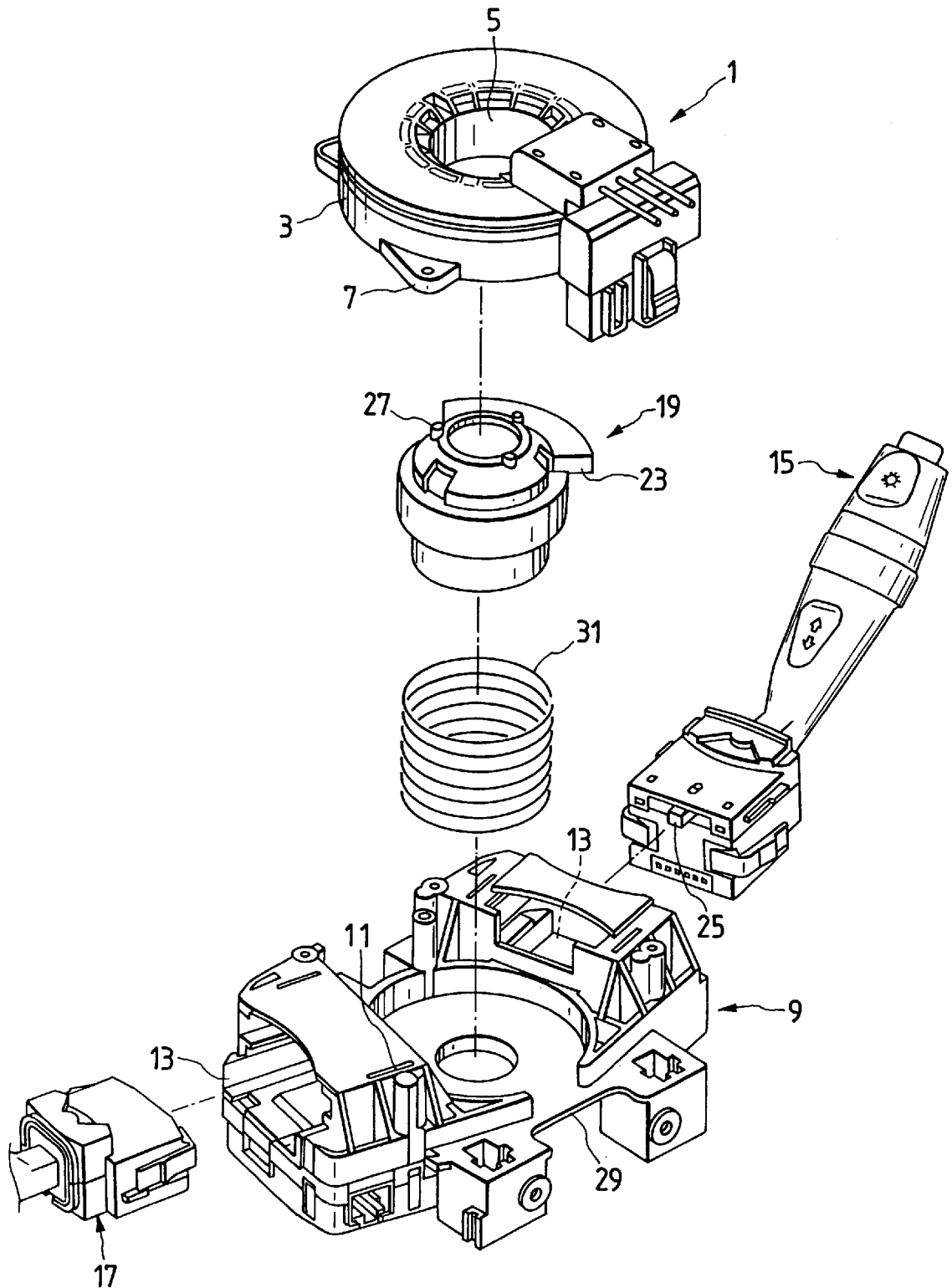
FIG. 1 is an exploded perspective view of a conventional column.
Figure 2:
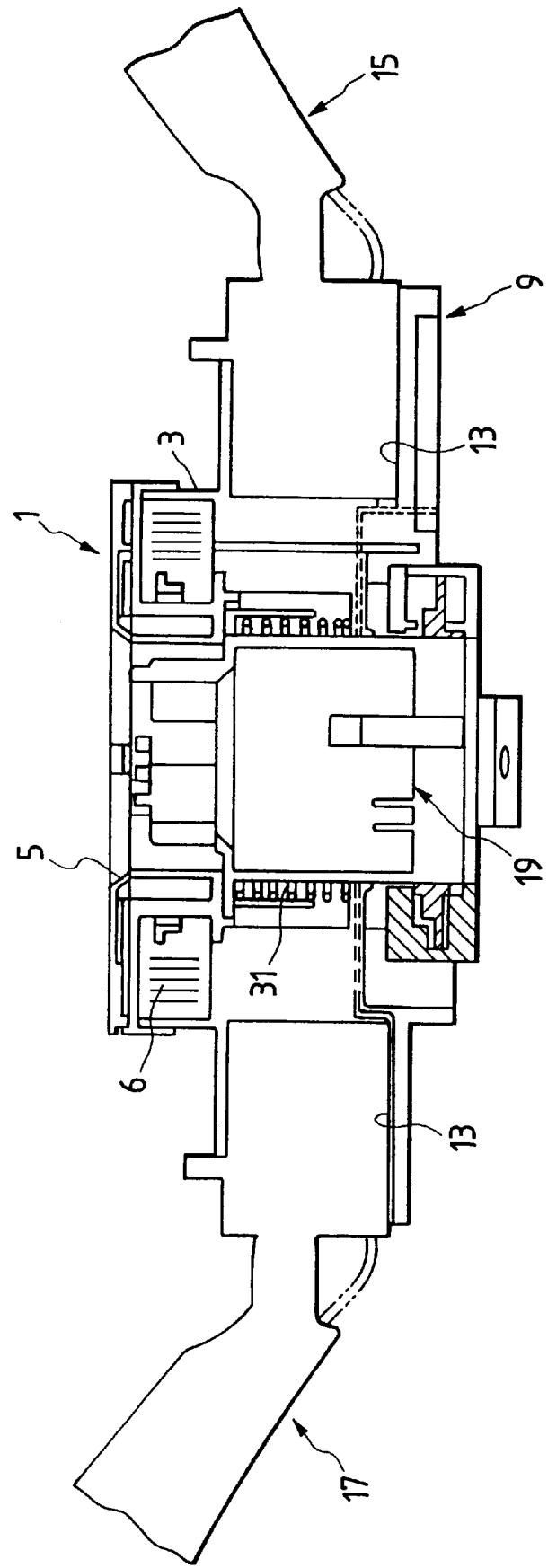
FIG. 2 is a section view of the column shown in FIG. 8, taken along the axial direction of a steering shaft.

According to the thus structured SRC 46, an upper cover 53 is integrally rotatable with the steering wheel and the canceler portion 57 is integrally formed with the upper cover 53. Thus, the SRC 46 not only fulfils its original function of supplying, electricity to the steering, but also can come into contact with the return portion 59 of the turn signal cancel mechanism to thereby return the turn signal lever 43 to its neutral position. This makes it possible not only to omit the movably structured canceler 19 (see FIG. 1) using the spring 31 (see FIG. 1) but also to assemble the column 41 to the SRC 46 with the reduced number of parts, in a compact assembly, and at an inexpensive cost.

Figure 5:
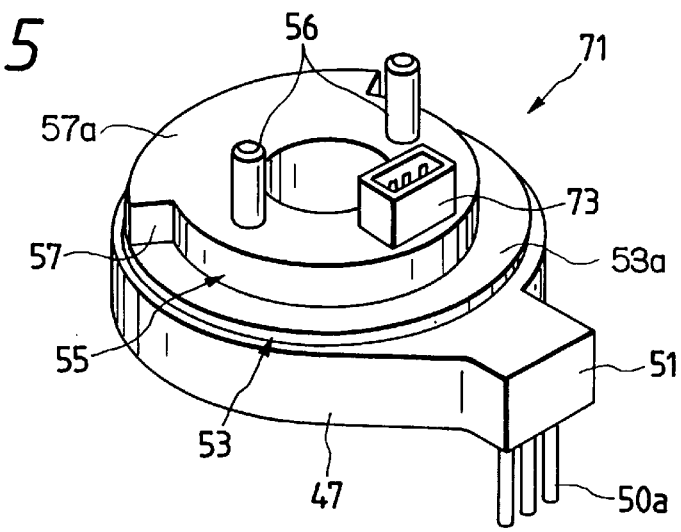
FIG. 5 is a perspective view of a second embodiment of a signal transmission device for a steering according to the invention.

Next, description will be given below of a second embodiment of a signal transmission device for a steering according to the invention with reference to FIG. 5. In particular, FIG. 5 is a perspective view of the second embodiment of a signal transmission device for a steering roller connector according to the invention. By the way, in FIG. 5, the same parts or portions as those shown in FIGS. 3 and 4 are given the same designations and thus the duplicated description thereof is omitted here.

An SRC 71 according to the present embodiment includes an auxiliary device connector 73 on the upper surface of the platform plate portion 55 in place of the above-mentioned cable 50b which is guided from the upper surface of the upper cover 53. The auxiliary device connector 73 is connected to the other end of a cable built in the SRC 71 and is arranged such that, when the steering wheel is mounted onto the steering shaft, it can be fitted directly with an auxiliary device terminal (not shown) such as a squib or the like which is provided on the steering.

According to the SRC 71, the auxiliary device connecting connector 73 is disposed on the upper cover 53 and is arranged such that it can be directly connected to the auxiliary device terminal on the steering wheel side. Due to this, not only provision of a wiring harness can be eliminated but also the auxiliary device connector 73 can be connected to the auxiliary device terminal at the same time when the steering is mounted, which can reduce the number of man-hour in operation.

Figure 6:
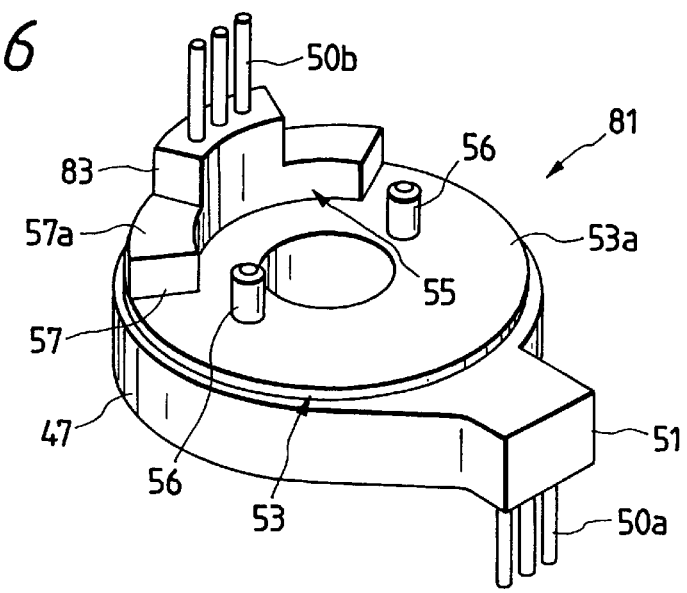
FIG. 6 is a perspective view of a third embodiment of a signal transmission device for a steering according to the invention.
Figure 7:
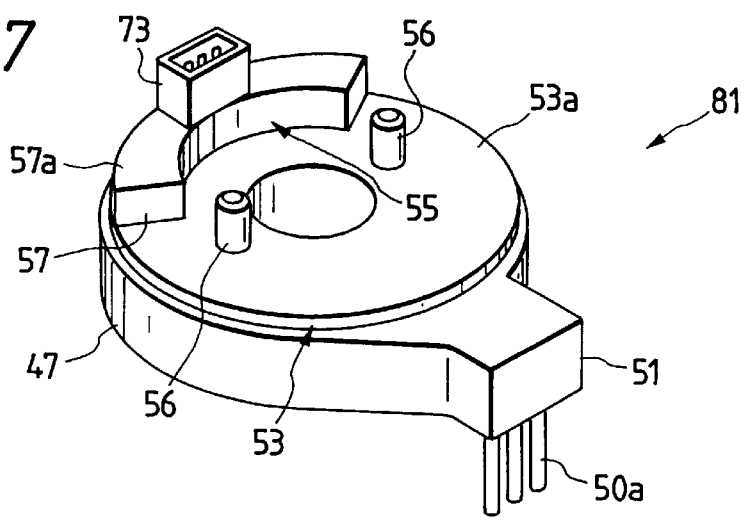
FIG. 7 is a perspective view of a modification of the signal transmission device for a steering shown in FIG. 6.

Next, description will be given below of a third embodiment of a signal transmission device for a steering roller connector according to the invention with reference to FIGS. 6 and 7. In particular, FIG. 6 is a perspective view of the third embodiment of a signal transmission device for a steering roller connector according to the invention, and FIG. 7 is a perspective view of a modification of the signal transmission device for a steering roller connector shown in FIG. 6. By the way, in FIGS. 6 and 7, the same parts or portions as those shown in FIGS. 3 and 4 are given the same designations and thus the duplicated description thereof is omitted here.

In an SRC 81 according to the present embodiment, the platform plate portion 55 except for the above-mentioned canceler portion 57 is omitted. In addition, a pair of bosses 56 are erected directly on the upper surface 53a of the upper cover 53. Also, a take-out portion 83 containing openings allowing the (see FIG. 6) exit of the other end 50b of the cable or an auxiliary device connector 73 (see FIG. 7) is disposed on the upper surface 57a of the canceler portion 57.

According to the present embodiment, the upper surface 53a of the upper cover 53 is used as a contact surface with the steering wheel, and the present contact surface is lower in height, by an amount corresponding to the platform plate portion 55 omitted, when compared with the above-mentioned SRC 46. By the way, in the present embodiment, the canceler portion 57 is projected upwardly from the lower surface of the steering wheel through a notch or the like formed in the lower surface of the steering wheel (not shown) and, in its projecting state, the canceler portion 57 can be contacted with the return portion 59 of the turn signal cancel mechanism to thereby return the turn signal lever 43 to its neutral position.

According to the present SRC 81, the height of the column 41 in the steering shaft direction can be reduced by an amount equivalent to the omitted portion of the platform plate portion 55, which makes it possible to reduce the size of the column 41 further.

Figure 8:
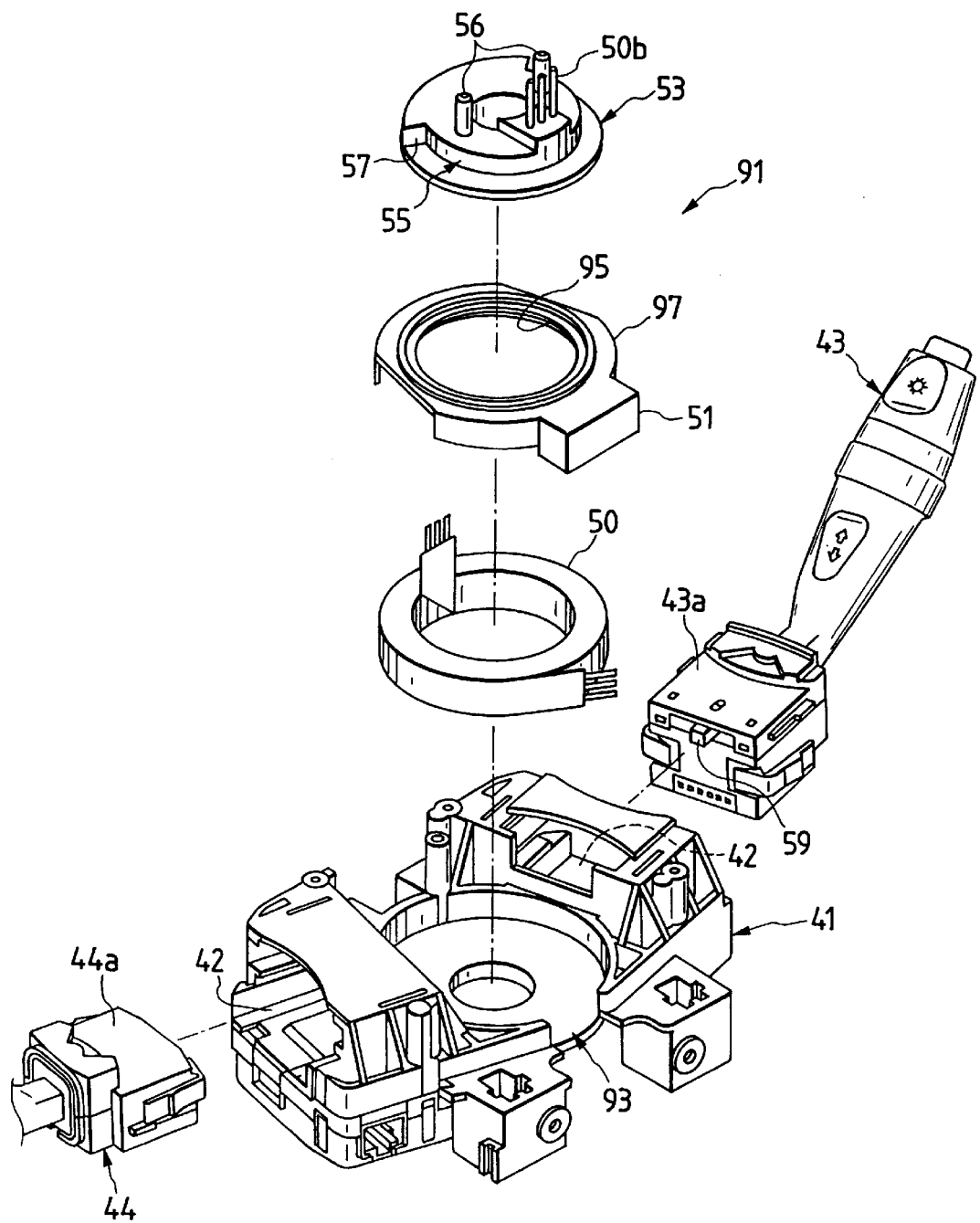
FIG. 8 is an exploded perspective view of a fourth embodiment of a signal transmission device for a steering according to the invention, in which it is shown together with a column.

Next, description will be given below of a fourth embodiment of a signal transmission device for a steering roller connector according to the invention with reference to FIG. 8. In particular, FIG. 8 is an exploded perspective view of the fourth embodiment of a signal transmission device for a steering roller connector according to the invention, together with a column. By the way, in FIG. 8, the same parts or portions as those shown in FIGS. 3 and 4 are given the same designations and thus the duplicated description thereof is omitted here.

In an SRC 91 according to the present embodiment, in the upper surface of a column 41, there is formed an annular recessed portion 93 coaxially with the steering shaft, while a cable 50 can be stored directly in the present annular recessed portion 93. The annular recessed portion 93 with the cable 50 stored therein is closed by a cover 97 including a steering shaft insertion hole 95. In the steering shaft insertion hole 95 of the cover 97, there is rotatably mounted an upper cover 53 which can be rotated integrally with the steering shaft. Similarly to the previously described SRC 46, the upper cover 53 is arranged such that the other end 50b of the cable 50 can be guided out from the upper surface thereof.

According to the present SRC 91, since the annular recessed portion 93 for storing the cable 50 therein is formed in the column 41, the SRC 91 can be assembled using part of the column 41 in common, which eliminates the provision of the outer cylinder 47 (see FIG. 4). This not only can reduce the number of parts but also can reduce the size of the column 41 by an amount equivalent to the outer cylinder 47 omitted.

Figure 9:
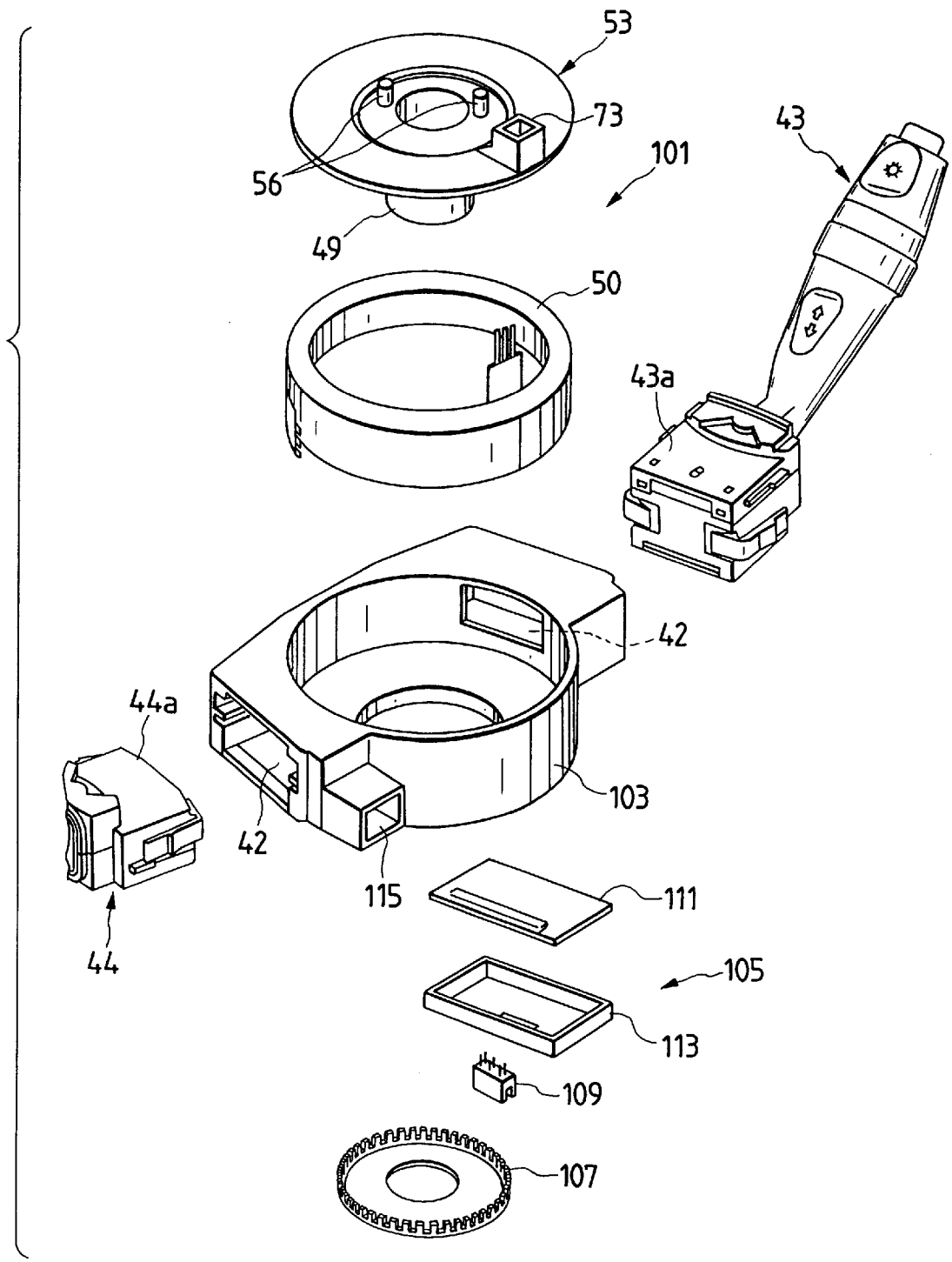
FIG. 9 is an exploded perspective view of a fifth embodiment of a signal transmission device for a steering according to the invention.

Next, description will be given below of a fifth embodiment of a signal transmission device for a steering according to the invention with reference to FIG. 9. In particular, FIG. 9 is an exploded perspective view of the fourth embodiment of a signal transmission device for a steering according to the invention. By the way, in FIG. 9, the same parts or portions as those shown in FIGS. 3 and 4 are given the same designations and thus the duplicated description thereof is omitted here.

In an SRC 101 according to the present embodiment, a pair of connector storage portions 42 are respectively formed in the two side surfaces of an outer cylinder 103 and, when mounting the outer cylinder 103, a connector portion 43a or 44a formed in the base end portion of a turn signal lever 43 or in a wiper control switch lever 44 may be electrically connected to either of the connector storage portions 42.

A steering angle sensor 105 is assembled to the lower side (lower side in FIG. 9) of the outer cylinder 103. The steering angle sensor 105 includes a slit plate 107 having a plurality of slits formed in the outer edge portion thereof, and a sensor portion 109 for fastening the slit plate 107. The slit plate 107 is mounted on the steering shaft in such a manner that it cannot be rotated with respect to the steering shaft, whereas the sensor portion 109 is fixed to the outer cylinder 103 side. Also, on the lower side of the outer cylinder 103, there is disposed an ECU 111 which is used to detect the rotation angle of the steering angle sensor 105, while the ECU 111 is covered with an ECU cover 113. The steering angle sensor 105 radiates the light from a light emitting diode provided in the sensor portion 109 into the slits of the slit plate 107 rotating integrally with the steering, receives the transmission light by means of a phototransistor provided in the sensor portion 109, converts the transmission light to current pulses by means of the ECU 111 and counts the number of the current pulses, thereby being able to detect the rotation angle of the steering.

The outer cylinder 103 includes a collective connector 115 formed integrally therewith; and, electric circuits respectively for the turn signal lever 43, wire control switch lever 44, cable 50, ECU 111 and the like are collected together and are connected to the collective connector 115 of the outer cylinder 103.

According to the present SRC 101, since only the essential components of the column are formed in the outer cylinder 103 to thereby form the outer cylinder 103 and column into a united body, simply by assembling the SRC 101, the SRC 101 and column structure can be constructed, which can eliminate an operation to assemble the SRC 101 and column to each other and thus can reduce the number of man-hour in assembling.

As has been described heretofore in detail, according to the signal transmission device for a steering roller connector of the invention, since the canceler portion is formed integrally on the upper cover which can be rotated integrally with the steering, there can be omitted a conventional canceler of a movable structure using a spring, so that the column can be assembled to the present signal transmission device for a steering roller connector with the reduced number of parts, in a compact manner, and at an inexpensive cost.

In addition, according to the signal transmission device for a steering roller connector structured such that the auxiliary device connector is disposed on the upper cover, there can be eliminated the provision of a wiring harness, which makes it possible to connect the auxiliary device connector to the auxiliary device terminal at the same time when the steering roller connector is mounted, thereby being able to reduce the number of man-hour in operation.

Also, according to the signal transmission device for a steering roller connector structured such that the steering wheel mounting contact surface is formed in the other portion of the upper surface of the upper cover than the canceler portion, the steering wheel can be directly contacted with and mounted onto the upper surface of the upper cover, so that the mounting height of the steering wheel can be lowered by an amount equivalent to the canceler portion.

Further, according to the signal transmission device for a steering roller connector structured such that the annular recessed portion is formed in the upper surface of the column and the cable is stored in the annular recessed portion, the signal transmission device for a steering roller connector can be assembled by using part of the column in common, which eliminates the need for provision of the outer cylinder and thus the column can be reduced in size by an amount equivalent to the outer cylinder omitted.

Still further, according to the signal transmission device for a steering roller connector structured such that the connector storage portion is formed integrally in the outer cylinder, simply by assembling the signal transmission device for a steering, the column can be structured, which can eliminate an operation to assemble the signal transmission device for a steering roller connector and the column to each other, thereby being able to reduce the number of man-hour in assembling.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A signal transmission device comprising:

a column;

a turn signal lever mounted on said column and movable within a range containing its neutral position, said turn signal lever having a turn signal cancel mechanism with a return portion;

an outer cylinder fixedly mounted on said column; and a rotator rotatably disposed inside and concentrically with said outer cylinder; and a spirally arranged electrical cable stored in an annular storage chamber defined between said outer cylinder and said rotator, one end of said electrical cable being supported in said outer cylinder and another end of said electrical cable being supported in said rotator;

wherein said rotator includes an upper cover and a platform plate portion, which defines a canceler portion, connected to a top surface of said upper cover, said canceler portion is contactable with said return portion so as to return said turn signal lever to its neutral position.

2. A signal transmission device as set forth in claim 1, wherein said rotator, said upper cover, said platform plate portion, and said canceler portion are integrally formed.

3. A signal transmission device as set forth in claim 1, wherein an auxiliary device connector is connected to at least one of said upper cover and said platform plate portion, and said another end of said electrical cable is connected to said auxiliary device connector.

4. A signal transmission device as set forth in claim 1, wherein one part of an upper surface of said platform plate portion defines a steering wheel mounting contact surface, and said another end of said electrical cable is connected to at least one of said top surface of said upper cover and another part of said upper surface of said platform plate portion.

5. A signal transmission device as set forth in claim 3, wherein one part of an upper surface of said platform plate portion defines a steering wheel mounting contact surface, and at least one of said another end of said electrical cable and said auxiliary device connector is fixed to at least one of said top surface of said upper cover and another part of said upper surface of said platform plate portion.

6. A signal transmission device comprising:
   a column having an annular recessed portion formed in an upper surface thereof, through which a steering shaft can be inserted;
   a turn signal lever mounted on said column and movable within a range containing its neutral position, said turn signal lever having a turn signal cancel mechanism with a return portion;
   an upper cover for covering said recessed portion of said column, said upper cover being rotatable together with said steering shaft with respect to said column; and
   a spirally arranged electrical cable stored in an annular storage chamber defined between said recessed portion and said upper cover,
   wherein said upper cover is provided with a canceler portion which is contactable with said return portion so as to return said turn signal lever to its neutral position.

7. A signal transmission device for a steering as set forth in claim 6, wherein said annular recessed portion extends coaxially with said steering shaft, and said upper cover is rotatably mounted on said column while said upper cover closes an upper surface opening of said annular recessed portion.

8. A signal transmission device comprising:
   a column having an recessed portion;
   a lever unit having a connector portion and being mounted on said column; and
   a rotator rotatably disposed inside and concentrically with said recessed portion; and
   a spirally arranged electrical cable stored in an annular storage chamber defined between said recessed portion and said rotator, one end of said electrical cable being supported in said column, the other end of said electrical cable being supported in said rotator;
   wherein a connector storage portion is integrally formed in said column for mounting therein said connector portion of said lever unit to thereby electrically connect and hold said lever unit.

9. A signal transmission device comprising:
   a steering column defining a steering shaft hole and defining a plurality of switch connection sites;
   a turn signal lever mounted in at least one of said plurality of switch connection sites and movable within a range containing its neutral position;
   an outer cylinder fixedly mounted on said steering column; and
   a rotator rotatably disposed inside and concentrically with said outer cylinder; and
   an electrical cable stored in an annular storage chamber defined between said outer cylinder and said rotator, one end of said electrical cable being supported in said outer cylinder and another end of said electrical cable being supported in said rotator;
   a steering angle sensor, including slit plate having a plurality of slits formed on an outer edge thereof, an electronic counting unit, and a sensor portion provided with a light emitting source, said slit plate mounted on a steering shaft that rotates with respect to said outer cylinder and said sensor portion fixed to said outer cylinder, wherein said steering angle sensor utilizes said light emitting source and said electronic control unit to determine a rotation angle of a steering wheel;
   wherein at predetermined said rotation angles of said steering wheel, said electronic control unit selectively activates or deactivates at least one of a plurality of switches attached to said plurality of switch connection sites.

* * * * *